US010122824B1

(12) United States Patent
Chokhawala et al.

(10) Patent No.: US 10,122,824 B1
(45) Date of Patent: Nov. 6, 2018

(54) CREATION AND DELIVERY OF INDIVIDUALLY CUSTOMIZED WEB PAGES

(71) Applicant: Reflektion, Inc., San Mateo, CA (US)

(72) Inventors: Amar Chokhawala, Saratoga, CA (US); Hsiao-Ping Tseng, Fremont, CA (US); Sushant Shankar, Menlo Park, CA (US)

(*) Notice: Subject to any disclaimer, the term of this patent is extended or adjusted under 35 U.S.C. 154(b) by 384 days.

(21) Appl. No.: 14/986,825

(22) Filed: Jan. 4, 2016

Related U.S. Application Data

(63) Continuation-in-part of application No. 14/026,225, filed on Sep. 13, 2013.

(51) Int. Cl.
*G06F 15/16* (2006.01)
*H04L 29/08* (2006.01)
*G06N 99/00* (2010.01)

(52) U.S. Cl.
CPC ......... *H04L 67/327* (2013.01); *G06N 99/005* (2013.01); *H04L 67/02* (2013.01); *H04L 67/18* (2013.01)

(58) Field of Classification Search
CPC ....... H04L 67/327; H04L 67/02; H04L 67/18; G06N 99/005
See application file for complete search history.

(56) References Cited

U.S. PATENT DOCUMENTS

| | | | | |
|---|---|---|---|---|
| 8,028,902 B2* | 10/2011 | Ferrara | ................. | G06Q 10/00 235/380 |
| 8,136,726 B2* | 3/2012 | Ferrara | ................. | G06Q 10/00 235/380 |
| 8,328,090 B2* | 12/2012 | Ferrara | ................. | G06Q 10/00 235/380 |
| 8,578,366 B2* | 11/2013 | Ricci | ..................... | G06Q 10/06 717/173 |
| 8,793,584 B2* | 7/2014 | Chen | ....................... | G06F 8/20 709/217 |
| 9,311,427 B2* | 4/2016 | Kwan | ............... | G06F 17/30905 |
| 9,594,886 B2* | 3/2017 | Ricci | .................... | G06F 21/105 |
| 9,645,977 B2* | 5/2017 | Kwan | ................... | G06F 17/211 |
| 2006/0074769 A1 | 4/2006 | Looney et al. | | |
| 2010/0305999 A1 | 12/2010 | Fujioka | | |

\* cited by examiner

*Primary Examiner* — Sargon N Nano
*Assistant Examiner* — Andrea L Hurst
(74) *Attorney, Agent, or Firm* — Young's Patent Services, LLC; Bruce A. Young (57) ABSTRACT

A system includes a computer storage device to store a first and second set of information about individuals, and user interface design components. A computer server is coupled to the computer storage and is programmed to receive a request for a webpage from an individual's device and analyze the first and second set of information to predict differences in at least one key performance indicator for that individual. The server is further programmed to automatically select a user interface design component for presentation to the individual, automatically generate and transmit a first customized webpage with the selected user interface design component to the device, and in response to an interaction with the selected user interface design component on the first customized webpage, automatically generate and transmit a second customized webpage to the device to create a customized page flow.

22 Claims, 7 Drawing Sheets

CREATION AND DELIVERY OF INDIVIDUALLY CUSTOMIZED WEB PAGES

BACKGROUND

Technical Field

The present subject matter relates to creation and delivery of individually customized web pages to a user device from a computer server.

Description of Related Art

The World Wide Web provides a mechanism for a user to access a wide variety of information by downloading web pages that are typically formatted using a hypertext markup language (HTML). Many web pages provide links to other web pages, allowing a user to navigate from one page to another. Over time, HTML has evolved to allow for a very rich user experience including media and a variety of different types of user interface elements. A web page designer can spend a large amount of effort to make a web page look pleasing to an average user and to attempt to make it very enticing for a user to perform particular functions, such as purchase an item on the website. This task is quite different than the traditional task of laying out a static page of a magazine or catalog due to the wide variety of interactive options that are available to a web page designer that simply weren't possible on a piece of paper.

Many business entities collect information on their customers. In some cases, the information comes from a loyalty program where customers identify themselves at a point-of-sale so that their purchases can be tracked. The tracking information can be used by the business entity for many different purposes. In some cases, the tracking information is used to provide discounts, or other benefits, to the customer. In some cases, a coupon is provided to the customer, either in the store or later by mail, for products that the customer has purchased in the past, or for a competing brand of a product that they have purchased in the past. The business entity can also use the information to gauge the success of a marketing campaign, pricing strategies, or for many other purposes.

Many e-commerce websites collect information on users' actions on the website. In some cases, this information is anonymized and used to evaluate various aspects of the website. In other cases, the information is associated with a user, which is commonly done through the use of cookies stored on the user's computer. Some websites define an account for the user for the website and have the user log into the website which helps keep the information about the user that is stored on the website secure. The information can then be used for various purposes to make the website easier to use for that user. In some cases, the website stores a credit card number for the user. In some cases, recommendations are made to the user based on the user's past actions on the website.

Current recommendation systems seek to predict the 'rating' or 'preference' that an individual would give to an item they have not yet considered, using either a content based approach or a collaborative filtering approach. In a content based approach, the model is built from the characteristics of an item. In a collaborative filtering approach, the mode is built from characteristics of the user's social environment. But a user's interest in an item can be influenced by many factors, such as product description, brand, price, shipping charge, return policy, and the like. Current approaches for making automatic recommendations only consider a hard-coded set of limited features for a product, which reduces the accuracy of their predictions. They also customize a limited part of the user experience, such as a dedicated recommendations portion of the webpage, while the rest of the webpage is the same for everyone.

BRIEF DESCRIPTION OF THE DRAWINGS

The accompanying drawings, which are incorporated in and constitute part of the specification, illustrate various embodiments of the invention. Together with the general description, the drawings serve to explain the principles of the invention. They should not, however, be taken to limit the invention to the specific embodiment(s) described, but are for explanation and understanding only. In the drawings.

DETAILED DESCRIPTION

Delivering a customized web browsing experience can be vital in keeping a user's attention and driving user behavior. Different people will react to different presentations in different ways, and a web page customized for a first user to increase the odds that the first user will engage in desired behavior, such as purchasing a featured item, may not have the same effect on a second user. For example, the first user may be more likely to purchase an item in response to a bright color scheme with a small selection of items presented, while a second user may be more likely to purchase an item if the web page uses a muted color scheme with a large selection of items to choose from.

The challenge of presenting optimized web pages and page flows is unique to the World Wide Web, as such presentations were not possible in traditional merchandising where the same store display was seen by every customer walking through the store, or the same catalog was sent to thousands of customers. Determining how to customize the web pages and page flows for an individual is a difficult problem. Systems, methods, and computer program products that provide a solution to this problem are presented herein. An example system includes a computer storage device to store a first set of information that includes information related to interaction by a plurality of individuals with an entity, a second set of information that includes information related to the plurality of individuals from at least one internet source not controlled by the entity, and a plurality user interface design components. A computer server is coupled to the computer storage and a computer network. The computer server is programmed to receive a request, over the computer network, for a webpage from a device associated with a particular individual of the plurality of individuals and analyze the first set of information and the second set of information to predict differences in at least one key performance indicator for the particular individual in light of the plurality of user interface design components. The server is further programmed to automatically select at least one user interface design component from the plurality of user interface design components for presentation to the particular individual, based on the analysis, automatically generate and transmit a first customized webpage, in response to the request, over the computer network, to the device associated with the particular individual, the first customized webpage comprising the selected at least one user interface design component, and in response to an interaction with the selected at least one user interface design component, automatically generate and transmit a second customized webpage to the device associated with the particular individual to create a customized page flow.

In today's world, electronic data is collected on many aspects of an individual's experience, both online, and in the physical world. Examples of electronic data that is often collected on an individual includes information about purchases made at both retail stores and online, surveillance camera images, behaviors on a website, information on social media sites posted by the individual or by other people about the individual, online product reviews posted by the individual, and many other types of information. In some cases, the information is collected by an entity without the individual's knowledge or permission, but in many cases, the individual provides the information to the entity directly, or provides the entity permission to collect and use the data. This permission can come from the terms of use for logging into a website, terms of joining a loyalty program and providing the loyalty program identification to the entity, or by some other form of explicit or implicit permission from the individual.

With the advent of big data, machines have access to a vast range of information down to minute detail on their customers and the market in which they participate. This data can be used to provide customized interaction with an individual. A predictive machine learning engine built on a flexible and scalable architecture can consume and process unstructured big data in near real-time, which allows complex customized interaction that is unique to each individual.

For example, retailers can gather a wide array of segmented data, such as user profile, loyalty, purchase history, social feeds, geo-location, and more, related to their customers from their own websites, and from other websites that are not controlled by the retailer. In some cases, the same retailers also have information from their own physical retail stores, such as products, services, inventory, locations, digital content and business key performance indicators (KPI). Data can be collected by the retailer from any interaction point with the customer, including websites, apps running under Windows®, iOS or Android™, point-of-sale terminals, and video cameras or other physical sensors in retail locations. Beacons, or analytics technology, are inserted into some devices, such as websites and apps, in some embodiments, that allow real-time changes in a customer's behavior to be observed.

Other data that can be linked to an individual customer is extracted from other internet sources. The association between an individual customer and an internet source that is not controlled by the retailer can be done in several different ways. In some cases, the customer links their retailer loyalty account to one or more of their social media accounts. In some cases, a customer's credit card is registered with the retailer and permission granted to track purchases with that credit card. In some cases, the customer's name or other identifying information can be used to link other web information with the customer. Any method can be used to link a customer with information from other sources on the internet. Examples of internet sources not controlled by the retailer that can be used to obtain information related to an individual include, but are not limited to, social media sites such as Facebook or Twitter, rich site summary (RSS) feeds, product review websites, blogs, and personal websites of customers. Other internet related data can also be collected, such as, but not limited to, browsing history, click path, page view duration, mouse location and dwell-time, and geo-location, as well as information about webpages used by the customer such as color, size and shape of user interface elements, page layout, and the like. In some embodiments, the extracted data is then classified into different labels according to topic, interest, mood, color, brand, and the like.

A predictive machine learning engine takes the structured and unstructured data gathered from the retailer's own online and physical presence, as well as the data gathered from other websites, such as social media sites and online product reviews that can be associated with the retailer's customers, and predicts one or more key performance indicators for an individual customer based on various presentations that can be made to that individual customer. The machine learning engine uses techniques such as classification, collaborative filtering and logistic progression to manage the large data set provided. A cross-product of many different user-interest features is generated and the weight of the different user-interest features is found. The number of user-interest features analyzed can be into the millions, or even billions, of data points. User-interest features that are not important in influencing a key performance indicator are discarded to reduce the number of features to a number that can be presented to an individual customer, which is in the hundreds or less for many embodiments.

The user-interest features are then used to create a customized presentation for an individual customer. The customized presentation can take many different forms, including, but not limited to, a customized webpage layout, a customized webpage color scheme, a customized page flow for a website, a short textual message, an image, or an audio message. The presentation can contain any type of content, but in some embodiments, the customized presentation can include dynamic pricing, product discounts, coupons, loyalty rewards, or product bundles.

The customized presentation is then provided to the customer. In some embodiments, the customized presentation is sent to a computer that the customer is using or is otherwise associated with the customer, as one or more webpages or as data for an application running on the computer. In other embodiments, the customized presentation is sent to a mobile electronic device associated with the customer as a short message service (SMS) text message, a phone call, one or more webpages, or data for an app running on the mobile electronic device. In yet other embodiments, the customized presentation is sent to an electronic display and/or speaker near the customer in a retail store. In some cases, the customized presentation is interactive with the customer, but in other cases, the customized presentation is static, with no mechanism for a response from the customer. Multiple presentations on multiple devices can be provided for the customer in some embodiments.

Reference now is made in detail to the examples illustrated in the accompanying drawings and discussed below.

Figure 1:
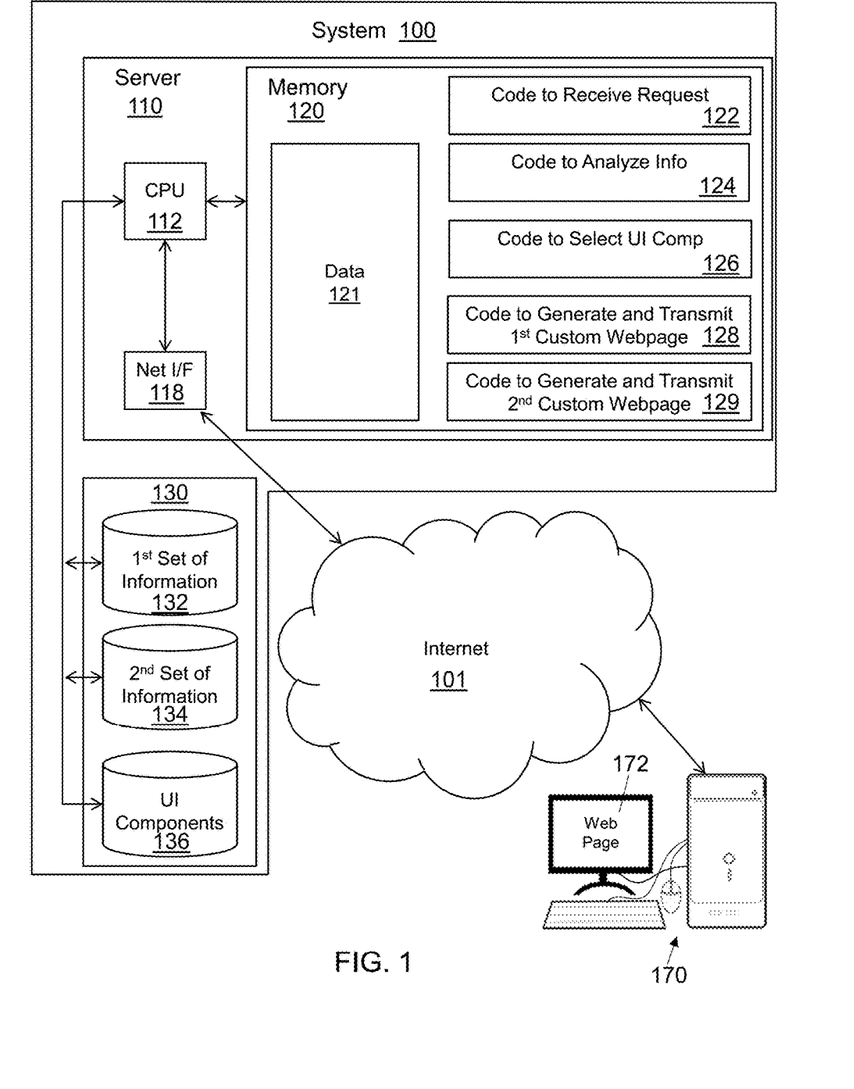
FIG. 1 shows a block diagram for an embodiment of a system for creation and delivery of individually customized web pages.

FIG. 1 shows a block diagram for an embodiment of a system 100 for creation and delivery of individually customized web pages. The system 100 includes a server 110 and one or more computer readable storage media 130. The server 110 includes one or more central processing units (CPU) 112, that are configured to execute computer program code. The server 110 also includes a network interface 118, coupled to the CPU 112, to allow the CPU 112 to communicate over a computer network, such as the internet 101. The server also includes memory 120, coupled to the CPU 112, to store computer program code 122-129 and data 121. The memory 120 can be any type of computer memory, including, but not limited to, volatile random access semiconductor memory of any type, non-volatile semiconductor memory, rotating magnetic or optical memory, or any combination of those computer memories or any other memory suitable for storing computer program code and/or computer readable data.

The one or more computer readable storage media 130 can be any type of computer readable storage, including any of the types of storage listed for the memory 120, and in some embodiments may be integrated with the memory 120 in the server 110. In other embodiments, the media 130 may be coupled to the server 110 through any type of disk interface, computer network, or other computer communication mechanism. The media 130 can store a variety of data. In at least one embodiment, the media 120 stores a first set of information that includes information related to interaction by a plurality of individuals with an entity, a second set of information that includes information related to the plurality of individuals from at least one internet source not controlled by the entity, and a plurality user interface design components. The first set of information may include information related to interaction by a particular individual with the entity and the second set of information may include information related to the particular individual from internet sources such as, but not limited to, social media sites such as Facebook or Twitter, rich site summary (RSS) feeds, product review websites, blogs, and personal websites of customers. Other internet related data can also be stored in the second set of information, such as, but not limited to, browsing history, click path, page view duration, mouse location and dwell-time, and geo-location, as well as information about webpages used by the plurality of individuals such as color, size and shape of user interface elements, page layout, and the like.

The memory 120 in the server 110 may hold a computer program. The computer program has code executable by the CPU 112 to program the CPU 112 to perform a variety of tasks. In at least one embodiment, the memory 120 includes code 122 to receive a request, over a computer network, such as the internet 101, for a webpage from a device 170 associated with a particular individual of the plurality of individuals. The device may be a desktop computer, a laptop computer, a tablet, a smartphone, or any other device capable of requesting a webpage from the server 110 and then displaying it to the user on a display 172. The memory 120 also includes code 124 to analyze the first set of information and the second set of information to predict differences in at least one key performance indicator for the particular individual in light of the plurality of user interface design components. The memory 120 also includes code 126 to automatically select at least one user interface design component from the plurality of user interface design components for presentation to the particular individual, based on the analysis. The memory 120 further includes code 128 to automatically generate and transmit a first customized webpage, in response to the request, over the computer network, to the device associated with the particular individual. The first customized webpage includes the selected at least one user interface design component. Code 129 is also included in the memory 120 to automatically generate and transmit a second customized webpage to the device associated with the particular individual, in response to an interaction with the selected at least one user interface design component, to create a customized page flow. The first and second customized webpages can then be presented on a display 172 of the device 170.

Figure 2:
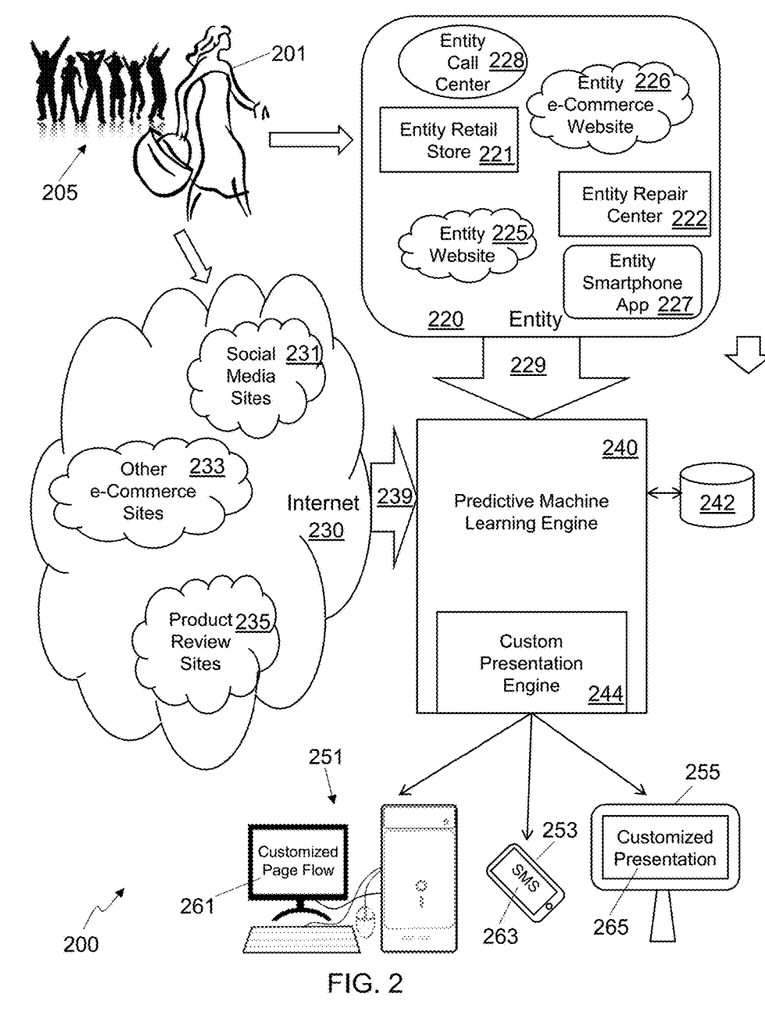
FIG. 2 is a data flow diagram for an embodiment of creation and delivery of individually customized web pages.

FIG. 2 is a data flow diagram for an embodiment 200 of creation and delivery of individually customized web pages. An entity 220, which can be any type of entity, such as an individual entity, a corporate entity, some other type of business entity, a government entity, a non-profit organizational entity, and the like, has a relationship with the individual, and may have relationships with other individuals 205 as well. The relationship between the entity 220 and the individual 201 can take any form, such as the individual 201 being a customer, client, or member of the entity 220, user of products or services provided by the entity 220, or a supplier to the entity 220, although other types of relationships are possible in some cases.

The entity 220 has one or more interaction points with the individual 201 that are a part of the entity 220. In some embodiments, the entity 220 has one or more physical presences, such as a retail store 221 and a repair center 222. In some embodiments, the entity 220 has one or more online presences, such as a corporate website 225, and an e-commerce website 226. In some embodiments, the entity 220 provides a smartphone app 227 or other computer program to run on an individual's electronic device, an electronic logging device, or other electronic device, to the individual 201, which can monitor the individual's activity or be used by the individual 201 to interact with the entity 220. In some embodiments, the entity 220 has other interaction points, such as an entity call center 228 that is used to interact with the individual 201.

The entity 220 collects information about the interaction between the individual 201 and the various interaction points 221-228 of the entity 220. In some embodiments, the entity 220 also collects information about the interaction between the other individuals 205 and the various interaction points 221-228 of the entity 220. The information gathered can be related to any aspect of the interaction, depending on the embodiment.

In some embodiments, information from an online presence 225-226 is collected, such as information about individual interface elements presented to the individual, click-through information for the user interface elements presented to the individual, information about a page of the website, and dwell-time information for the page of the website. Other information can be collected from an online presence 225-226 in other embodiments, such as mouse paths and pauses, information about products displayed, information about purchases made, searches performed, or any other type of information that is available to an online presence 225-226 of the entity 220. In some embodiments, information about items examined by the individual 201 is collected, where an examination is determined by the products displayed, the items clicked on, the mouse path, or some combination of those items. An individual 201 can be identified by the online presence of the entity 220 by using any method, but in some embodiments, the individual 201 logs into the website and a cookie is provided to the computer, smartphone, or other device accessing the website which is then used to associate the actions taken from that device with the individual 201. In at least some embodiments, the login credentials are tied to an account of the entity 220, such as a loyalty account, a credit account, or some other type of account of the entity. In some embodiments, geographical information from the device accessing the website is used to help identify the individual 201. In some embodiments, information about an interaction with an online presence is gathered without associating the information with an individual, or anonymously.

In some embodiments, information about the interaction between a physical presence 221-222 and an individual 201, and in some embodiments, other individuals 205, is collected. Information about the interaction between an individual 201 and the physical presence can be gathered at a point-of-sale terminal in a retail store 221, an informational kiosk in the physical presence 221-222, or sensors such as surveillance cameras or radio frequency identification (RFID) readers located in the physical presence 221-222, or other devices, depending on the embodiment. The individual can be identified using any method, depending on the embodiment, including, but not limited to, swiping a loyalty card, using a credit card, carrying an RFID tag, or being identified by facial recognition software on the video captured. The information collected can be any type of information, but in at least one embodiment, the information includes location information about the individual 201 from one or more sensors in the retail store 221 and layout information for the retail store 221 so that products or services that the individual 201 was exposed to in the retail store 221 can be identified. The layout information may include stock locations of various products in the retail store 221. In some embodiments, the information collected includes information on one or more items purchased from the entity 220 by the individual 201, and information about examinations of one or more items, provided by the entity 201, by the individual 201.

The information collected about interactions between the entity 220 and the individual 201, and in some embodiments other individuals 205, from various parts of the entity 220 itself is referred to as the first set of information 229 herein. So while the first set of information 229 includes information about interactions between the entity 220 and an individual 201, in some embodiments, the first set of information 229 also includes information related to interactions by other individuals 205 with the entity 220, and in some of those embodiments, some of those interactions are anonymous.

The individual 201 also interacts with other resources on the internet 230. Information is obtained by the entity from at least one internet source that is not controlled by the entity 220. The types of sources that the individual 201 uses, depending on the individual, include one or more social media websites 231 associated with the individual 201, third-party e-commerce websites 233, websites where products are reviewed 235, and other types of websites too numerous to detail here. The entity 220 obtains information about the individual 201 from at least one of the other internet sources. The information on the other websites can be associated with the individual 201 using any method, including using a common login credential, such as a Facebook account, with an entity website 225, identification of the information on the other website by the individual 201 to the entity 220, using the individual's name or other identifying characteristic, identification of other cookies on the individual's computer, using a registered credit card on the other website, or any other method. Any type of information can be gathered from the at least one internet source not controlled by the entity 220 in various embodiments, including, but not limited to, one or more product reviews by the individual 201, products purchased or examined by the individual 201, and searches performed by the individual 201.

The information from the at least one internet source that is not controlled by the entity 220 can be obtained in various ways, depending on the embodiment. In some embodiments, the information is sent to the entity 220 from the other internet source. In other embodiments, the information is scraped from the other internet source by programs and provided to the entity 220. Other embodiments use different methods of obtaining the information for the at least one internet source. The information from the at least one other internet source not controlled by the entity 220 is referred to as the second set of information 239 herein, and includes information about interaction between the individual 201 and the at least one internet source not controlled by the entity 220, and in some embodiments, includes information about interaction between the other individuals 205 and the at least one internet source not controlled by the entity 220, some of which may be anonymous.

In embodiments, the first set of information 229 and the second set of information 239 are provided to a predictive machine learning engine 240. The predictive machine learning engine 240 can be a part of the entity 220, or be outside of the entity 220, depending on the embodiment. In some embodiments, the predictive machine learning engine 240 stores the first set of information 229 and/or the second set of information 239 on a hard drive 242 or other computer readable storage medium. In other embodiments, a different module stores the first set of information 229 and/or the second set of information 239 on a computer readable storage medium. The predictive machine learning engine 240 uses the information 229, 239 to create different scenarios of customized presentations for the individual 201. The predictive machine learning engine then analyzes the first set of information 229 and the second set of information 239 to predict key performance indicators (KPI) for the individual based on the different scenarios of customized presentations for the individual 201. The custom presentation engine 244, which in some embodiments can be integrated into the predictive machine learning engine 240, then generates a customized presentation for the individual 201 based on the predicted KPIs and a KPI goal.

Key performance indicators can be any measure of the interaction between the entity 220 and the individual 201 or other individuals 205, but can include indicators such as predicted click-through rate or probability of the individual 201 clicking on a particular user-interface element, a conversion rate or probability of the individual 201 making a purchase, a bounce rate or the probability that the individual 201 leaving the website after viewing only the initial landing page, a rate of increasing return individuals or the probable increase in the percentage of individuals coming to a website site that are return visitors, the rate of increasing purchase size or the probable increase in the dollar amount of a purchase, abandon rate or the probability that the individual 201 leaves the website without purchasing items in their online shopping cart, number of ad impressions per visit, time spent on the website or physical retail store, or any other metric, depending on the embodiment. A KPI goal is provided to the predictive machine learning engine 240 and/or the custom presentation engine 244 in some embodiments, and the KPI goal can be used to generate a customized presentation to try to meet the KPI goal.

The customized presentation is customized for a particular individual 201 and can take many different forms, depending on the embodiment, including, but not limited to, textual information, one or more images, an audio message, a static presentation, or an interactive presentation. The customized presentation can include a product promotion, such as an advertisement, discount price, or coupon, a brand promotion, information about the individual's loyalty account, or any other type or information. The customized presentation is then provided to the individual 201 through one or more electronic devices. In some embodiments, the customized presentation is sent to a computer system 251 as a customized page flow 261 that includes one or more custom webpages. In some embodiments, the customized presentation 263 is sent to a mobile electronic device 253, such as a smartphone or tablet, associated with the individual 201 as a short text message via a short message service (SMS) or a chat message. In some embodiments, the customized presentation 265 is set to a display 255 near the individual 201 in the retail store 221. In some embodiments, the customized presentation is data sent to an application running on an electronic device associated with the individual 201, such as the computer 251 or the mobile electronic device 253.

Figure 3:
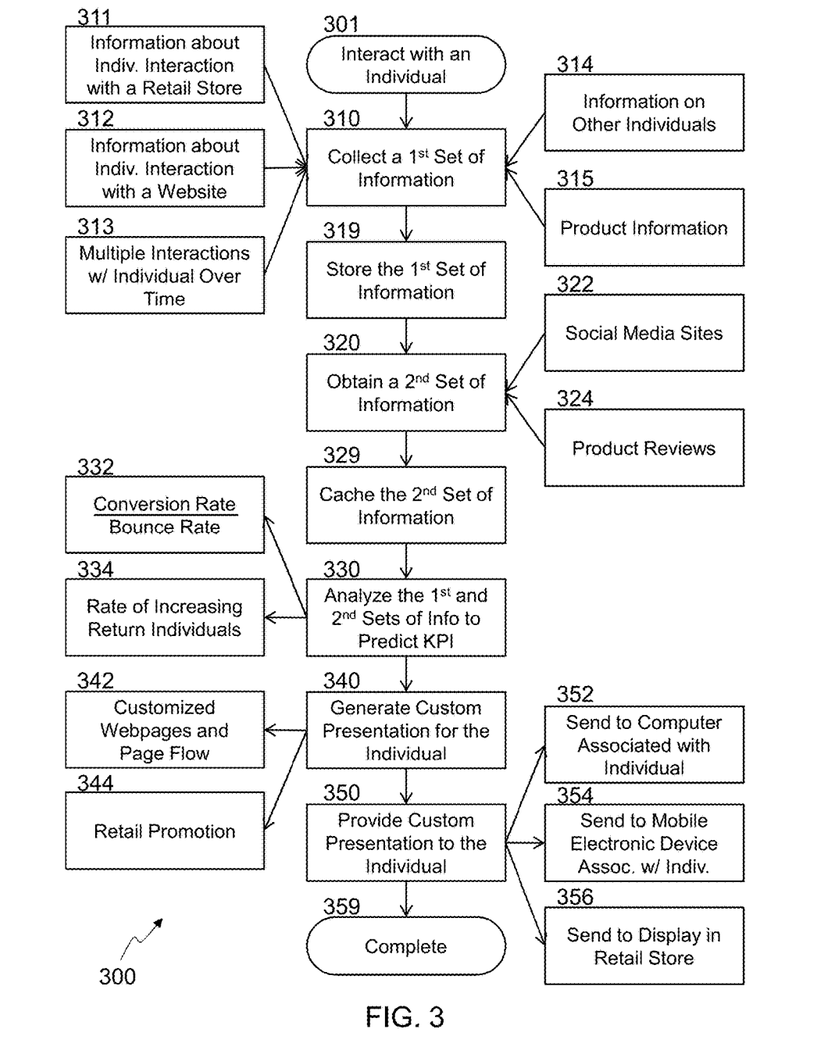
FIG. 3 is a flow chart for an embodiment of a method for creation and delivery of individually customized web pages.

FIG. 3 is a flow chart for an embodiment of a method 300 for creation and delivery of individually customized web pages. The computer-implemented method 300 starts at block 301 and continues to block 310 where the first set of information related to interaction by an individual with an entity is electronically collected. Various types of information can be collected for the first set of information, depending on the embodiment, including, but not limited to, information about the individual's interaction with a retail store of the entity from block 311, and information about the individual's interaction with a website controlled by the entity from block 312. The information about the individual's interaction with the website can include, but is not limited to, information about individual interface elements presented to the individual, click-through information for the user interface elements presented to the individual, information about a page of the website, and dwell-time information for the page of the website, depending on the embodiment. In some embodiments, information related to multiple, separate, interactions by the individual at multiple interaction points of the entity over a period of time greater than one day from block 313 is collected as a part of the first set of information. In some embodiments, information on interactions between the entity and other individuals from block 314, and/or product information from block 315 are collected for the first set of information. In various embodiments, the first set of information is stored on a computer readable media for later use at block 319.

A second set of information related to the individual from at least one internet source not controlled by the entity is obtained at block 320 in embodiments. The second set of information can contain any type of information, depending on the embodiment, including information related to the individual from social media sites such as Facebook or Twitter from block 322, and product reviews by the individual from block 324. In some embodiments, the second set of information is cached, or stored on a computer readable media, for later use at block 329.

At block 330, in embodiments, the first set of information and the second set of information are analyzed, using a processor, to predict differences in at least one key performance indicator (KPI) in response to different presentations to the individual. A KPI can be any measure of the interaction between the individual and the entity, depending on the embodiment, including, but not limited to, a ratio of conversion rate to bounce rate from block 332, or a rate of increasing return individuals from block 334.

In embodiments at block 340, a customized presentation for the individual, based on the analyzing, is generated. The customized presentation can take any form, depending on the embodiment, including customized webpages and/or a customized page flow for a website from block 342. In other embodiments, the customized presentation can be a text message, an image, or a voice message, and the customized presentation can be static or interactive. Depending on the embodiment, the customized presentation can include a retail promotion from block 344, such as a coupon, a price discount, or an advertisement, and/or the customized presentation can include other information.

The method 300 includes providing the customized presentation to the individual at block 350. Depending on the embodiment, the customized presentation can be sent to a computer associated with the individual at block 352, sent to a mobile electronic device associated with the individual at block 354, and/or sent to a display or speaker close to the individual in a retail store at block 356. The method is complete at block 359, although other embodiments can include additional steps, blocks, or actions.

Aspects of various embodiments are described with reference to flowchart illustrations and/or block diagrams of methods, apparatus, systems, and computer program products according to various embodiments disclosed herein. It will be understood that various blocks of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and/or block diagrams in the figures help to illustrate the architecture, functionality, and operation of possible embodiments of systems, devices, methods, and computer program products of various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems, or circuitry, that perform the specified functions or acts, or combinations of special purpose hardware, circuitry, and computer instructions.

Figure 4:
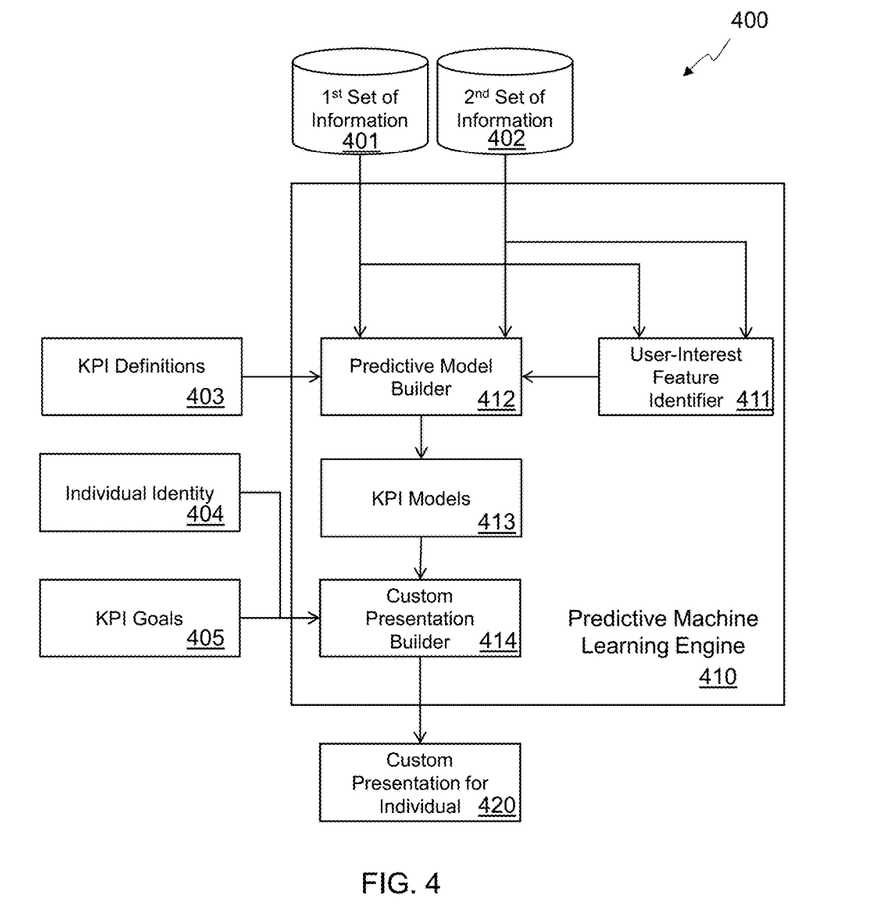
FIG. 4 is a data flow diagram for an embodiment of a predictive machine learning engine.

FIG. 4 is a data flow diagram 400 for an embodiment of a predictive machine learning engine 410. The predictive machine learning engine 410, in at least some embodiments, uses at least one processor programmed to perform predictive machine learning to analyze the first set of information

401 and the second set of information 402. The predictive machine learning engine 410 uses historical data to make predictions on unknown events or occurrences. In embodiments, a user-interest identifier module 411 analyzes both the $1^{st}$ set of information 401 that includes information about interaction between individuals and the entity, and the second set of information 402 that includes information about interaction between individuals from other internet sources. The user-interest identifier module 411 uses the analysis to identify user-interest features in the information 401, 402, which may also be referred to as classification in some embodiments. Examples of user-interest features that may be identified include user interface (UI) design components such as a UI skin, button layout, type of merchandise displayed, brands displayed, page flow, discounts, and the like, as well as various types of content such as coupons, in-store merchandise display design, and the like. The user-interest features can then be provided by the user-interest identifier module 411 to the predictive model builder module 412.

The predictive model builder module 412, in various embodiments, also receives the first set of information 401 and the second set of information 402 along with KPI definitions 403. A KPI can be any type of indicator, but in at least some embodiments, a KPI can be a ratio of conversion rate to bounce rate, or a rate of increasing return individuals. By analyzing the first set of information 401 and the second set of information 402, in light of the user-interest features provided by the user-interest identifier module 411, the predictive model builder module 412 builds mathematical predictive KPI models 413 for a particular individual that have user-interest features as the variables in the model. The KPI models 413 are built to be generalizable beyond a particular occurrence of a datum in embodiments. As the first set of information 401 and second set of information 402 are updated, the KPI models 413 are updated in many embodiments, so that the KPI models 413 are current and up-to-date with the latest data collected.

Embodiments of the predictive model builder module 412 search for consistent patterns and systematic relationships between variables and then validate the findings by applying the detected patterns to events for a set of users, and/or events for single user. Embodiments of the user-interest feature identifier module 411 and the predictive model builder 412 use one or more algorithms such as classification, collaborative filtering, and logistic regression to handle structured and unstructured data streams from a wide range of data. An embodiment of the predictive model builder module 412 uses a robust, unsupervised learning algorithm to select mathematical models to fit the data from both the first set of information 401 and the second set of information 402. Embodiments utilize inter-model weighting and dependency while an intra-model is trained with a combination of offline and online parallel algorithms. In some embodiments, rank aggregation is performed using partial rank orderings to obtain a global ranking. The collected data can then be viewed as partial information about an underlying distribution over complete orderings of all objects. One application of this for some embodiments is to calculate a product ranking for a specific individual using limited click data.

The KPI models 413, along with the identity of a targeted individual 404 and KPI goals 405, can then be used in embodiments by the custom presentation builder module 414 to generate a customized presentation 420 for the individual. For a customized presentation 420 to be presented as a page flow on a website, the custom presentation builder module 414 dynamically generates a page flow that highlights the products and features that are predicted to induce the individual to take action in line with the KPI goals 405. For example, for an individual who adds an item to their shopping cart to find the shipping cost, embodiments of the custom presentation builder module 414 can dynamically insert a dialog box to show shipping cost. Each individual can have a dynamic page flow that is customized to induce the desired behavior from the individual and is different than other individuals' page flows.

For other interaction points, such as a retail store or an application, embodiments of the custom presentation builder module 414 can generate appropriate customized presentations based on the KPI models 413 for an identified individual 404 and KPI goals 405. For example, in a retail store, a text message can be sent to the individual's phone to show a bundling discount in response to the individual examining one of the products in the bundle if the individual has purchased bundles in the past. Or a game can be offered to an individual as a part of a smartphone app as a reward for posting reviews to an individual who often visits gaming sites on the internet.

Figure 5A:
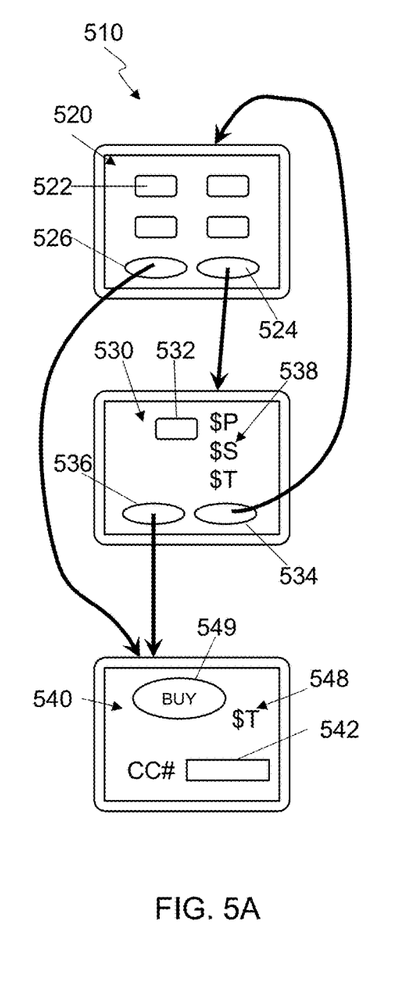
FIGS. 5A and 5B show customized page flows for two different individuals generated by an embodiment.
Figure 5B:
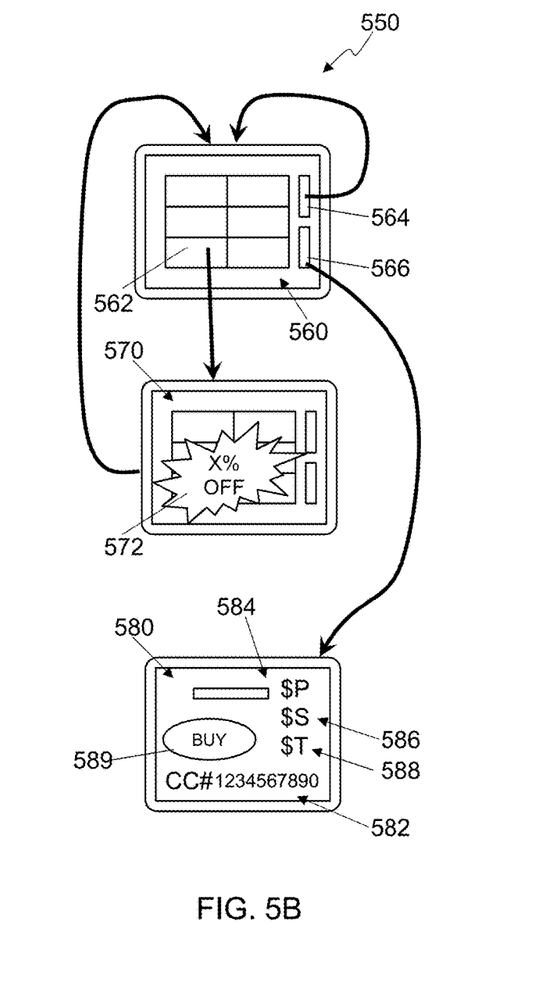

FIGS. 5A and 5B show customized page flows for two different individuals generated by an embodiment. FIG. 5A shows a customized page flow 510 of a website for a first individual generated by an embodiment. In embodiments, the customized presentation that is the customized page flow 510 for the first individual is sent to a client device associated with the first individual in response to an action by the first individual, such as navigating to a webpage of the entity and clicking on various user-interface elements. Information about the first individual's interactions with the entity, as well as information from other internet sources, was gathered and analyzed to generate the page flow 510 for a website of the entity.

In response to the first individual navigating to the website, an embodiment generates the first page 520 which is customized for the first individual. The example customized first page 520 includes several user-interface elements, including four product images/descriptions such as product image description 522, and a plurality of buttons, specifically an "Add to Cart" button 524, and a checkout button 526. In the example customized first page 520, the number of product images/descriptions, the specific images/descriptions shown, the layout of the various user-interface elements 522-526, and the color scheme are customized for the first individual based on analyzing information about the individual's interaction with the entity in the past, and information about the individual from other internet sources. So, in at least some embodiments, the customized presentation includes at least one webpage with a customized layout of user interface elements and a customized color scheme. In some cases, the first page 520 may be based on a web page template selected for the first individual from a plurality of web page templates.

The example customized page flow 510 is configured so that if the first individual clicks on the "Add to Cart" button 524, a second customized webpage 530 is displayed to the first individual that shows the product added to the cart 532 and the shipping price 538, which was not previously visible. This is done in the example customized page flow 510 because data from previous interactions between the first individual and the entity showed that the first individual had previously either abandoned items in the cart or had gone to the cart to see the shipping cost before going back to continue shopping. This behavior had been analyzed and it was determined that a KPI of conversion rate could be increased by showing the first individual the shipping cost immediately after adding something to the shopping cart. The second customized webpage 530 can also have a custom layout, color scheme, user-interface elements, or other features that are customized for the first individual in embodiments.

In the example customized page flow 510, the first individual can navigate back to the first customized webpage 520 by clicking on the "Continue Shopping" button 534. In some embodiments, the first webpage 520 is further customized after a product is added to the cart, such as providing different product information or product promotional information for products related to the product 532 added to the shopping cart.

The first individual can checkout and complete the purchase either by clicking on the checkout button 526 from the first customized webpage 520 or the checkout button 536 on the second customized webpage 530. In the example customized web flow 510, clicking on either checkout button 526, 536 navigates the user to a third custom webpage 540 to complete the purchase of the items in the electronic shopping cart. The example third custom webpage 540 shows the first individual the total cost of the order 548 and provides a field 542 to enter a credit card because the first individual does not allow a credit card number to be saved on the website. Once the first individual has entered their credit card number into the field 542, the first individual can click the buy button 549 to complete the purchase.

FIG. 5B shows a customized page flow 550 of a website for a second individual generated by an embodiment. In embodiments, the customized presentation that is the customized page flow 550 for the second individual is sent to a client device associated with the second individual in response to an action by the second individual, such as navigating to the same webpage of the entity as was done by the first individual in FIG. 5A. Information about the second individual's interactions with the entity, as well as information from other internet sources, was gathered and analyzed to generate the page flow 550 for the website of the entity that is different than the page flow 510 generated for the first individual, even though the two individuals navigated to the same unified resource locator (URL) in some embodiments.

In response to the second individual navigating to the website, an embodiment generates the first page 560 which is customized for the second individual. The first page 560 is different than the first page 510 generated for the first individual. The example customized first page 560 includes several user-interface elements, including six product images/descriptions such as product image description 562, which is a different number of products arranged differently, and might be different products. In some cases, the first page 560 may be based on a web page template selected for the first individual from a plurality of web page templates. An "Add to Cart" button 564, and a checkout button 566 are different in shape and location in the example shown. In the example customized first page 560, the number of product images/descriptions, the specific images/descriptions shown, the layout of the various user-interface elements 562-566, and the color scheme are customized for the second individual based on analyzing information about the individual's interaction with the entity in the past, and information about the individual from other internet sources.

The example customized page flow 550 is configured so that if the second individual clicks on the "Add to Cart" button 564, the second individual stays on the first page, although one or more elements on the first page can be updated in some embodiments to reflect the fact that something has been added to the online shopping cart. This is done in the example customized page flow 550 because data from previous interactions between the second individual and the entity showed that the second individual had not been shown concern about shipping cost. This behavior had been analyzed in the embodiment, and it was determined that a KPI of conversion rate could be increased by maximizing the time that the second individual is provided with purchasing options.

In the example customized page flow 550, a product image 562 is configured to show a product promotion if the second individual mouses over the product image 562, leading to the customized presentation image 570 of a pop-up window 572 shown over the first webpage 560. If the second individual clicks on the product promotion pop-up window 572, product 562 is added to the cart in embodiments. The pop-up window 572 can also have a custom layout, color scheme, user-interface elements, or other features that are customized for the second individual in embodiments. After a time delay, or after the second individual adds the product to the cart, the pop-up window 572 is removed and the first page 560 is again shown.

The second individual can checkout and complete the purchase by clicking on the checkout button 566 from the first customized webpage 560. In the example customized web flow 550, clicking on the checkout button 566 navigates the user to a third custom webpage 580 to complete the purchase of the items in the electronic shopping cart. The example third custom webpage 580 shows the second individual the product information and cost 584, the shipping cost 586, and the total cost of the order 588 and shows a saved credit card 582 because the second individual has stored a credit card number on the website. The second individual can click the buy button 589 to complete the purchase. Note that the third custom webpage 580 for the second individual is different that the third custom webpage 540 for the first individual.

As the first and second individuals are interacting with the first page flow 510 and second page flow 550 respectively, information can be gathered about the individuals' behavior to be added to the first set of information. The expanded first set of information can then be re-analyzed, along with the second set of information, to improve the KPI predictions. Various types of instrumentation can be included in the page flows 510, 550 to facilitate information collection beyond typical data gathered by a website, such as mouse tracking, page view times, or other metrics, in some embodiments.

In other embodiments, a different type of customized presentation can be generated, depending on the embodiment and on the individual. Any aspect of a presentation can be customized in various embodiments. The device used for the presentation can also be customized for the individual, in embodiments. In some embodiments, the customized presentation can be data for an app running on a tablet or smartphone of the individual. The app can then use the data to customize the presentation to the individual and, in some embodiments, can combine the data received with localized information, such as geolocation data, to customize the presentation further, such as waiting until the individual is close to a retail store of the entity to present the customized product promotion presentation to the individual. Other embodiments can customize images, user-interface elements, colors, promotion details, page layout, sound and volume levels, or any other aspect of the customized presentation for the individual.

Figure 6:
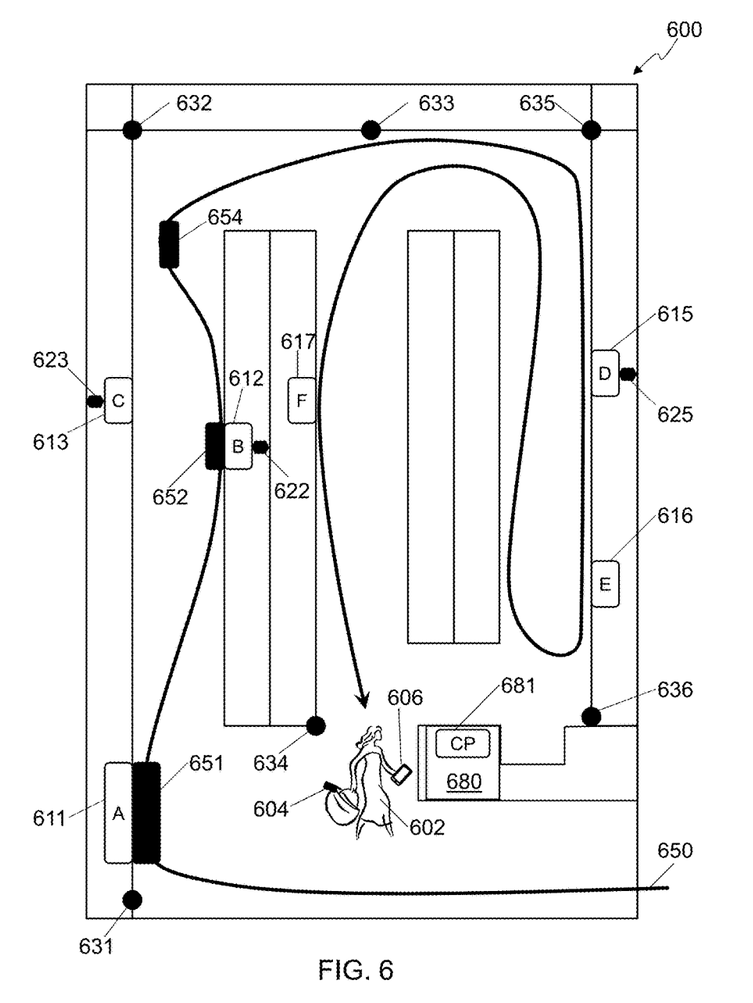
FIG. 6 shows a schematic of a physical retail store with sensors for use in an embodiment.

FIG. 6 shows a schematic of a physical retail store 600 with sensors for use in an embodiment. In the example shown, an individual 602 enters the store 600 and follows path 650 through the store before approaching a point-of-sale terminal 680. The individual 602 carries a smartphone 606 that has an app for the entity that owns the retail store 600 and that the individual 602 has provided with details of the her loyalty program membership for the entity. As a part of the loyalty program membership, the individual 602 received a RFID tag 604, that she has attached to her purse. In other embodiments, the smartphone may contain an RFID tag that the individual 602 has registered with the entity.

As the individual 602 walks through the store 600 in the example, she stops in several locations 651-654 for various lengths of time. During some of the stops, the individual is in close engagement with products on the store's shelves. In embodiments, various sensors can monitor the individual 602 to detect her interaction with the products. The example store 600 includes six video cameras 631-636 that can track the individual 602 to identify the individual using facial recognition software and/or determine the individual's location in the store 600. So as the individual stops at location 651 to examine product A 611, at least the first video camera 631 and the fourth video camera 634 can see the individual 602, and triangulate to determine her location in the store 600. The individual's location can then be used in embodiments to determine that the individual 602 paused to examine product A 611, which can be collected as a part of the first set of information in some embodiments.

The individual 602 continues to location 652 to examine product B 612. A sensor, such as RFID reader 622, can determine that she stopped to examine product B 612 and provide information on product B 612 as a part of the first set of information in some embodiments. The individual 602 bypasses product C 613 so the RFID reader 623 does not detect her presence. As the individual 602 pauses at location 654 to talk to a friend, the cameras 631-636 can detect her location and determine that she is not near any products. As the individual 602 continues on her path 650, she passes near product D 615, product E 616, and product F 617 without stopping or examining them. While the RFID sensor 625 may detect a momentary presence of the RFID tag 604 on the individual's purse, no dwell time at the product 615 was detected so no information about product D 615 was collected and included in the first set of information. And while the video cameras can detect the individual's location as she passes by product E 616 and product F 617, the lack of dwell time in those locations can be used to indicate no particular interest in those products. So, because location information about the individual 602 from the video cameras 631-636 and/or the RFID readers 612, 625, along with product information corresponding to the locations of pauses by the individual 602, can be provided in various embodiments, the first set of information includes location information about the individual from one or more sensors in the retail store 600 and layout information for the retail store 600 in some embodiments. In other embodiments, other types of sensors can be used to provide information about the products in which the individual 602 shows interest or information about the activities of the individual 602 in the store 600.

At the end of her shopping, the individual 602 approaches the POS terminal 680 to pay for her purchases. Some number of product A 611, and product F 617 are scanned by the POS terminal 680 and purchased. So, it can be noted that while the individual 652 paused a product B 612, she did not purchase any of product B 612, and that even though the individual 602 did not pause a product F 617, she did take some of product F 617 off the shelf. In-store display information about the various products 611-617 can also be provided as a part of the first set of information in some embodiments, to allow that class of information to be analyzed. In some embodiments, a customized presentation to the individual 602 is sent to an electronic display 681 located in the physical retail store 600, such as in the POS terminal 680, although other displays may be provided in the store 600.

Figure 7:
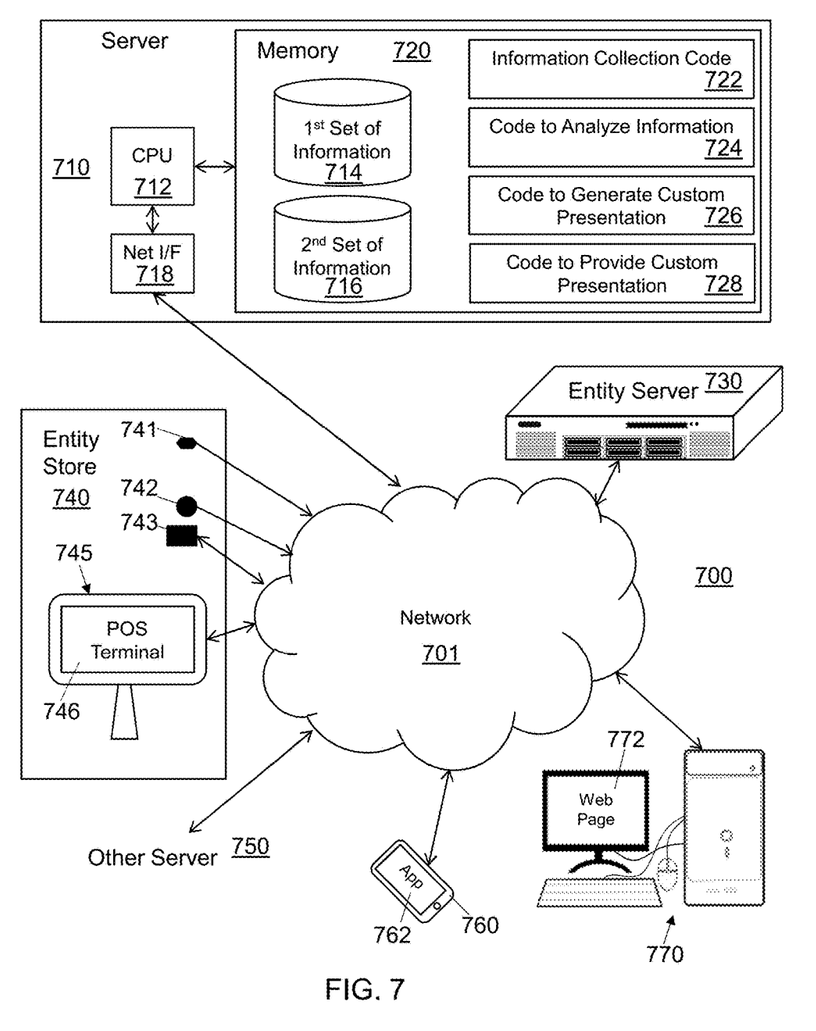
FIG. 7 shows an embodiment of an electronic system for creation and delivery of individually customized web pages.

FIG. 7 shows an electronic system 700 for creation and delivery of individually customized web pages. The electronic system 700 includes a network 701 that can include one or more local area networks, one or more wide area networks, and/or some portion of the internet. A computer system, or server, 710 to interact with an individual, is included in the system 700. The computer system 710 includes a memory 720 to store instructions and/or information. The memory 720 can be any type of memory capable of storing computer data, including, but not limited to, volatile or nonvolatile semiconductor-based memory, spinning magnetic media based hard drives, or optical discs. Any number of physical memory devices of any type can be used for the memory 720. The computer system 710 also includes a network interface 718 to communicate over the computer network 701. The computer system 710 also includes at least one processor 712 coupled to the memory 720 and the network interface 718.

The memory 720 includes at least one non-transitory computer readable storage medium having computer program code embodied therewith. The computer program code includes information collection code 722 to collect a first set of information 714. The first set of information 714 includes information related to interaction by an individual with an entity. In some embodiments, the information collection code 722 includes instructions to store the first set of information 714 on a computer readable medium. The information collection code 722 also includes computer program code to obtain a second set of information 716 related to the individual from at least one internet source not controlled by the entity. In some embodiments, the information collection code 722 includes instructions to store the second set of information 716 on a computer readable medium. The computer program code also includes code to analyze 724 the first set of information and the second set of information to predict differences in at least one key performance indicator in response to different presentations to the individual. In some embodiments, the computer program code includes code to perform predictive machine learning to analyze the first set of information and the second set of information. The computer program code also includes code to generate a customized presentation 726 for the individual based on the analyzing. The computer program code also includes code to provide the customized presentation 728 to the individual. In some embodiments, the computer program code includes code to send the at least one customized presentation to a client device associated with the individual in response to an action by the individual.

The at least one processor 712, in some embodiments, is able to read the computer program code and execute the code so that the at least one processor 712 is programmed to collect a first set of information over the computer network, the first set of information comprising information related to interaction by an individual and/or other individuals with an entity. The at least one processor 712 is also programmed to obtain a second set of information related to the individual and/or other individuals from at least one internet source not controlled by the entity, over the computer network. The at least one processor 712 is also programmed to analyze the first set of information and the second set of information to predict differences in at least one key performance indicator in response to different presentations to the individual. And the at least one processor 712 is also programmed to generate a customized presentation for the individual based on the analyzing and to provide the customized presentation to the individual over the computer network 701.

In some embodiments, the system 700 also includes one or more client devices associated with an individual, such as the mobile electronics device 760 and/or the computer 770. So, in some embodiments, the at least one processor 712 is further programmed to send the at least one customized presentation to a client device 760, 770 associated with the individual in response to an action by the individual. The customized presentation can be data for an app 762 on the mobile electronics device 760, a customized webpage 772 for display on the computer 770, or any other type of customized presentation, depending on the embodiment.

The system 700 includes interaction points of an entity, such as the entity server 730 which is coupled to the network 701, and/or an entity store 740, in embodiments. The entity server 730 can collect information about interactions with various individuals that can be provided as a part of the first set of information 714. The entity server 730 can be any type of server, including, but not limited to, a corporate web presence, an e-commerce server, an informational kiosk, or a content server.

The entity store 740, which can be a physical retail location or some other type of store or physical interaction point, depending on the embodiment, can have one or more point-of-sale (POS) terminals 745 that can include a customer visible display to show a customized presentation 746 to an individual in some embodiments. In some embodiments, other displays, speakers, or other devices capable of providing a customized presentation to the individual are included in the entity store 740. The entity store can also include one or more sensors, such as the RFID reader 741, the video camera 742, and the magnetic card reader 743 in various embodiments. The POS terminal 745 and the sensors 741-743 are coupled to the network 701 in embodiments and can collect information about interactions with various individuals that can be provided as a part of the first set of information 714.

The example system 750 also includes another server 750 that is not controlled by the entity. The other server 750 contains information about the individuals that interact with the entity in the example. Information about the individuals that interact with the entity can be collected by the server 710 and included in the second set of information in some embodiments. Examples of information that can be collected from the other server 750 in some embodiments include information posted on social media sites, a personal webpage, or product review sites by the individuals that interact with the entity.

In the preceding detailed description, numerous specific details are set forth by way of examples in order to provide a thorough understanding of the relevant teachings. However, it should be apparent to those skilled in the art that the present teachings may be practiced without such details. In other instances, well known methods, procedures and components have been described at a relatively high-level, without detail, in order to avoid unnecessarily obscuring aspects of the present concepts. A number of descriptive terms and phrases are used in describing the various embodiments of this disclosure. These descriptive terms and phrases are used to convey a generally agreed upon meaning to those skilled in the art unless a different definition is given in this specification. This application is a related to U.S. patent application Ser. No. 14/026,225, filed on Sep. 13, 2013, the entire contents of which is incorporated by reference herein for any and all purposes.

As will be appreciated by those of ordinary skill in the art, aspects of the various embodiments may be embodied as a system, device, method or computer program product apparatus. Accordingly, aspects of the present invention may take the form of an entirely hardware embodiment, an entirely software embodiment (including firmware, resident software, micro-code, or the like) or an embodiment combining software and hardware aspects that may all generally be referred to herein as a "server," "circuit," "module," "client," "computer," "logic," or "system." Furthermore, aspects of the various embodiments may take the form of a computer program product embodied in one or more computer readable medium(s) having computer program code stored thereon.

Any combination of one or more computer readable storage medium(s) may be utilized. A computer readable storage medium may be embodied as, for example, an electronic, magnetic, optical, electromagnetic, infrared, or semiconductor system, apparatus, or device, or other like storage devices known to those of ordinary skill in the art, or any suitable combination of computer readable storage mediums described herein. In the context of this document, a computer readable storage medium may be any tangible medium that can contain, or store a program and/or data for use by or in connection with an instruction execution system, apparatus, or device.

Computer program code for carrying out operations for aspects of various embodiments may be written in any combination of one or more programming languages, including an object oriented programming language such as Java, Smalltalk, C++, or the like, and conventional procedural programming languages, such as the "C" programming language or similar programming languages. The computer program code if loaded onto a computer, or other programmable apparatus, produces a computer implemented method. The instructions which execute on the computer or other programmable apparatus may provide the mechanism for implementing some or all of the functions/acts specified in the flowchart and/or block diagram block or blocks. In accordance with various implementations, the program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The computer program code stored in/on (i.e. embodied therewith) the non-transitory computer readable medium produces an article of manufacture.

The computer program code, if executed by a processor causes physical changes in the electronic devices of the processor which change the physical flow of electrons through the devices. This alters the connections between devices which changes the functionality of the circuit. For example, if two transistors in a processor are wired to perform a multiplexing operation under control of the computer program code, if a first computer instruction is executed, electrons from a first source flow through the first transistor to a destination, but if a different computer instruction is executed, electrons from the first source are blocked from reaching the destination, but electrons from a second source are allowed to flow through the second transistor to the destination. So a processor programmed to perform a task is transformed from what the processor was before being programmed to perform that task, much like a physical plumbing system with different valves can be controlled to change the physical flow of a fluid.

As used in this specification and the appended claims, the singular forms "a", "an", and "the" include plural referents unless the content clearly dictates otherwise. Thus, for example, reference to an element described as "a product" may refer to a single product, two products or any other number of products. As used in this specification and the appended claims, the term "or" is generally employed in its sense including "and/or" unless the content clearly dictates otherwise. As used herein, the term "coupled" includes direct and indirect connections. Moreover, where first and second devices are coupled, intervening devices including active devices may be located there between.

Any element in a claim that does not explicitly state "means for" performing a specified function, or "step for" performing a specified function, is not to be interpreted as a "means" or "step" clause as specified in 35 U.S.C. § 112(f).

The description of the various embodiments provided above is illustrative in nature and is not intended to limit the invention, its application, or uses. Thus, different variations beyond those described herein are intended to be within the scope of the embodiments of the present invention. Such variations are not to be regarded as a departure from the intended scope of the present invention. As such, the breadth and scope of the present invention should not be limited by the above-described exemplary embodiments, but should be defined only in accordance with the following claims and equivalents thereof.

What is claimed is:

1. A computer system to provide customized webpages, the computer system comprising:
   (a) one or more computer readable storage media, the media storing:
      (i) a first set of information comprising information related to interaction by a plurality of individuals with an entity;
      (ii) a second set of information comprising information related to the plurality of individuals from at least one internet source net controlled by another entity different from the entity; and
      (iii) a plurality of user interface design components;
   (b) a computer server coupled to the computer storage and a computer network, the computer server programmed to:
      (i) receive a request, over the computer network, for a webpage from a device associated with a particular individual of the plurality of individuals;
      (ii) analyze the first set of information and the second set of information to predict a difference, for the particular individual, in at least one key performance indicator between presentation of a first user interface design component to the particular individual and presentation of a second user interface design component to the particular individual, wherein the plurality of user interface design components includes the first user interface design component and the second user interface design component;
      (iii) automatically select the first user interface design component from the plurality of user interface design components for presentation to the particular individual, based on the analysis;
      (iv) automatically generate and transmit a first customized webpage, in response to the request, over the computer network, to the device associated with the particular individual, the first customized webpage comprising the first user interface design component; and
      (v) in response to an interaction with the first user interface design component, automatically generate and transmit a second customized webpage to the device associated with the particular individual to create a customized page flow.

2. The computer system of claim 1, wherein the entity comprises a website; and
   wherein the first set of information comprises information about user interface design elements presented to the individual, click-through information for the user interface design elements presented to the individual, information about a page of the website, and dwell-time information for the page of the website.

3. The computer system of claim 1, wherein the entity comprises a physical retail store; and
   wherein the first set of information comprises location information about the individual from one or more sensors in the retail store and layout information for the retail store.

4. The computer system of claim 1, wherein the at least one key performance indicator comprises a ratio of conversion rate to bounce rate, or a rate of increasing return individuals.

5. The computer system of claim 1, wherein the computer server is further programmed to perform predictive machine learning to analyze the first set of information and the second set of information.

6. The computer system of claim 1, wherein the first customized webpage has a customized first layout, the second customized webpage has customized second layout that is different than the first layout, and both the first and second customized webpage have a common customized color scheme.

7. The computer system of claim 1, wherein the request for the webpage from the device associated with the particular individual is a first request and the first request comprises a particular URL; and
   the computer server is further programmed to:
      (vi) receive a second request, over the computer network, for the webpage from a second device associated with a second individual of the plurality of individuals, the second request comprising the particular URL; and
      (vii) automatically generate and transmit a third customized webpage, in response to the second request, over the computer network to the second device associated with the second individual, wherein the third customized webpage is different than the first customized webpage.

8. The computer system of claim 1, wherein the interaction with the first user interface design component comprises a mouse-over and the second customized webpage comprises a pop-up window to be displayed over the first customized webpage.

9. The computer system of claim 1, wherein the plurality of user interface design components comprise one or more of a user interface skin, a plurality of buttons, or a button layout.

10. The computer system of claim 1, wherein the at least one internet source not controlled by the entity comprises one or more social media websites.

11. A computer-implemented method to provide customized webpages to a client device associated with an individual, the method comprising:
    collecting a first set of information electronically, the first set of information comprising information related to interaction by the individual with an entity;
    storing the first set of information on a computer readable media;
    obtaining a second set of information comprising information related to the individual from at least one internet source controlled by another entity different from the entity;
    analyzing, using a processor, the first set of information and the second set of information to predict a difference, for the individual, in at least one key performance indicator in response to different presentations to the individual;
    automatically generating a customized presentation for the individual based on the analyzing, the customized presentation comprising:
        a first dynamically generated customized webpage comprising a customized color scheme and a customized layout of user interface elements, including a first button, selected from a previously stored plurality of user interface design components; and
        a second dynamically generated customized webpage, linked to the first button of the first customized webpage, to provide a customized page flow for the individual; and
    providing the customized presentation to the individual by sending the customized presentation, over a computer network, to a client device associated with the individual in response to action by the individual.

12. The method of claim 11, wherein the entity comprises a website; and
    wherein the first set of information comprises information about user interface elements presented to the individual, click-through information for the user interface elements presented to the individual, information about a page of the website, and dwell-time information for the page of the website.

13. The method of claim 11, wherein the entity comprises a physical retail store; and
    wherein the first set of information comprises location information about the individual from one or more sensors in the retail store and layout information for the retail store.

14. The method of claim 11, wherein the first set of information comprises information on one or more items purchased from the entity by the individual, and information about examinations, by the individual, of one or more items provided by the entity.

15. The method of claim 11, wherein the first set of information comprises information related to multiple, separate, interactions by the individual at multiple interaction points of the entity over a period of time greater than one day.

16. The method of claim 11, wherein the first set of information comprises information related to interactions by other individuals with the entity; and
    the second set of information comprises information related to the other individuals from the at least one internet source not controlled by the entity.

17. The method of claim 11, wherein the at least one internet source not controlled by the entity comprises one or more social media websites associated with the individual.

18. The method of claim 11, wherein the second set of information comprises one or more product reviews by the individual on the at least one internet source not controlled by the entity.

19. The method of claim 11, wherein the analyzing the first set of information and the second set of information comprises predictive machine learning.

20. The method of claim 11, wherein the at least one key performance indicator comprises a ratio of conversion rate to bounce rate, or a rate of increasing return individuals.

21. The method of claim 11, wherein the entity comprises a physical retail store; and
    wherein the providing the customized presentation to the individual comprises sending the customized presentation to an electronic display located in the physical retail store.

22. An article of manufacture comprising at least one non-transitory computer readable storage medium having computer program code embodied therewith to provide customized webpages to a client device associated with an individual, the computer program code comprising:
    computer program code to collect a first set of information, the first set of information comprising information related to interaction by the individual with an entity;
    computer program code to obtain a second set of information related to the individual from at least one internet source controlled by another entity different from the entity;
    computer program code to analyze the first set of information and the second set of information to predict a difference, for the individual, in at least one key performance indicator in response to different presentations to the individual;
    computer program code to automatically generate a customized presentation for the individual based on the analyzing, the customized presentation comprising:
        a first dynamically generated customized webpage comprising a customized color scheme and a customized layout of user interface elements, including a first button selected from a previously stored plurality of user interface design components; and
        a second dynamically generated customized webpage, linked to the first button of the first customized webpage, to provide a customized page flow for the individual; and
    computer program code to provide the customized presentation to the individual by sending the customized presentation, over a computer network, to a client device associated with the individual in response to action by the individual.

\* \* \* \* \*